United States Patent
Kosai

(10) Patent No.: US 12,344,725 B2
(45) Date of Patent: Jul. 1, 2025

(54) RUBBER COMPOSITION AND RUBBER PRODUCT

(71) Applicant: BRIDGESTONE CORPORATION, Tokyo (JP)

(72) Inventor: Tomoyuki Kosai, Chuo-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 456 days.

(21) Appl. No.: 17/917,139

(22) PCT Filed: Apr. 12, 2021

(86) PCT No.: PCT/JP2021/015208
§ 371 (c)(1),
(2) Date: Oct. 5, 2022

(87) PCT Pub. No.: WO2021/215292
PCT Pub. Date: Oct. 28, 2021

(65) Prior Publication Data
US 2023/0183456 A1   Jun. 15, 2023

(30) Foreign Application Priority Data
Apr. 22, 2020   (JP) ................................ 2020-076143

(51) Int. Cl.
| | | |
|---|---|---|
| *C08K 13/02* | (2006.01) | |
| *C08L 9/06* | (2006.01) | |
| C08K 3/04 | (2006.01) | |
| C08K 3/36 | (2006.01) | |
| C08K 5/378 | (2006.01) | |

(52) U.S. Cl.
CPC ................ *C08K 13/02* (2013.01); *C08L 9/06* (2013.01); *C08K 3/04* (2013.01); *C08K 3/36* (2013.01); *C08K 5/378* (2013.01)

(58) Field of Classification Search
CPC .................................. C08K 13/02; C08L 9/06
USPC ........................................................ 524/100
See application file for complete search history.

(56) References Cited

U.S. PATENT DOCUMENTS

| 2,804,450 A | 8/1957 | Naylor |
| 3,801,537 A | 4/1974 | Westlinning et al. |
| 4,024,141 A * | 5/1977 | Kobzina ............... C07D 251/50 544/204 |

FOREIGN PATENT DOCUMENTS

| JP | 06-279633 A | 10/1994 |
| JP | 07-314603 A | 12/1995 |
| JP | 2000-044787 A | 2/2000 |
| JP | 2004-250696 A | 9/2004 |
| JP | 2011252069 A | * 12/2011 |
| JP | 2015-063648 A | 4/2015 |
| JP | 2017-226732 A | 12/2017 |

OTHER PUBLICATIONS

International Search Report of PCT/JP2021/015208 dated Jun. 15, 2021 [PCT/ISA/210].
H. Westlinning, "Vulcanization of Rubber with Aminomercaptotriazines", Rubber Chemistry and Technology, 1970, vol. 43, No. 5, pp. 1194-1214.
Extended European Search Report issued Sep. 28, 2023 in European Application No. 21792011.5.

* cited by examiner

*Primary Examiner* — Deve V Hall
(74) *Attorney, Agent, or Firm* — Sughrue Mion, PLLC

(57) ABSTRACT

A rubber composition contains a rubber component containing at least one selected from the group consisting of an isoprene rubber, a butadiene rubber, and a styrene-butadiene copolymer rubber, and a compound (1) represented by the following general formula (1). By using the rubber composition, it is possible to produce a rubber product having an excellent balance between a low strain hysteresis loss and a high strain hysteresis loss.

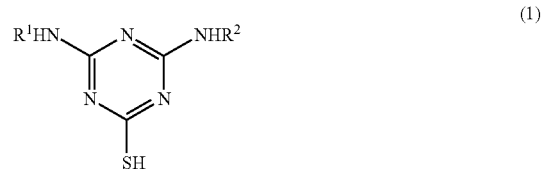

(1)

[$R^1$ and $R^2$ in the general formula (1) each independently represent a hydrogen atom, an alkyl group having 1 to 20 carbon atoms, or an aryl group having 5 to 20 carbon atoms.]

15 Claims, No Drawings

RUBBER COMPOSITION AND RUBBER PRODUCT

CROSS REFERENCE TO RELATED APPLICATIONS

This application is a National Stage of International Application No. PCT/JP2021/015208 filed on Apr. 12, 2021, claiming priority based on Japanese Patent Application No. 2020-076143 filed on Apr. 22, 2020.

TECHNICAL FIELD

The present invention relates to a rubber composition and a rubber product.

BACKGROUND ART

In a rubber field, it has been studied that various additives are added to a rubber composition in order to improve a vulcanization rate of a rubber component or to impart various functions to a vulcanized rubber.

For example, PTL 1 has studied that a compound having a triazine ring is mixed to a rubber composition in order to enhance a vulcanization accelerating effect.

CITATION LIST

Patent Literature

PTL 1: U.S. Pat. No. 2,804,450

SUMMARY OF INVENTION

Technical Problem

In recent years, a vulcanized rubber having strength higher than that in the related art has been required, but PTL 1 has not conducted a study for obtaining such a vulcanized rubber.

An object of the present invention is to provide a rubber product having an excellent balance between a low strain hysteresis loss and a high strain hysteresis loss, and a rubber composition from which the rubber product can be produced, and to achieve the object.

Solution to Problem

<1> A rubber composition containing: a rubber component containing at least one selected from the group consisting of an isoprene rubber, a butadiene rubber, and a styrene-butadiene copolymer rubber; and a compound (1) represented by the following general formula (1).

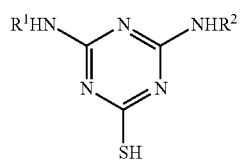

$R^1$ and $R^2$ in the general formula (1) each independently represent a hydrogen atom, an alkyl group having 1 to 20 carbon atoms, or an aryl group having 5 to 20 carbon atoms.

<2> The rubber composition according to <1> further containing: 5 parts by mass or more of silica with respect to 100 parts by mass of the rubber component.

<3> The rubber composition according to <1> or <2> further containing: 30 parts by mass or more of carbon black with respect to 100 parts by mass of the rubber component.

<4> The rubber composition according to any one of <1> to <3>, in which a content of the compound (1) is more than 0.5 parts by mass and 3 parts by mass or less with respect to 100 parts by mass of the rubber component.

<5> A rubber product using the rubber composition according to any one of <1> to <4>.

Advantageous Effects of Invention

The present invention can provide a rubber product having an excellent balance between a low strain hysteresis loss and a high strain hysteresis loss, and a rubber composition from which the rubber product can be produced.

DESCRIPTION OF EMBODIMENTS

Hereinafter, the present invention will be described in detail based on embodiments thereof.

In the following description, a description of "A to B" indicating a numerical range represents a numerical range including A and B that are end points, and represents "A or more and B or less" (where A<B) or "A or less and B or more" (where B<A).

The parts by mass and % by mass have the same meaning as parts by weight and % by weight, respectively.

<Rubber Composition>

A rubber composition of the present invention contains: a rubber component containing at least one selected from the group consisting of an isoprene rubber (IR), a butadiene rubber (BR), and a styrene-butadiene copolymer rubber (SBR); and a compound (1) represented by the following general formula (1).

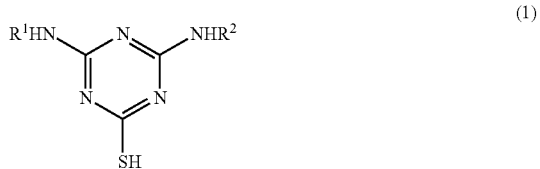

$R^1$ and $R^2$ in the general formula (1) each independently represent a hydrogen atom, an alkyl group having 1 to 20 carbon atoms, or an aryl group having 5 to 20 carbon atoms.

When the rubber composition contains the rubber component containing at least one diene-based polymer selected from the group consisting of IR, BR, and SBR, and the compound (1), a vulcanized rubber obtained by vulcanizing the rubber composition has an excellent balance between a low strain hysteresis loss (for example, 10%) and a high strain hysteresis loss (for example, 250%).

Generally, in the rubber component, rubber molecular chains are crosslinked by covalent bonds by vulcanization, and when an external load is applied to the vulcanized rubber, the vulcanized rubber expands or contracts. When rubber molecules receive a load that is too large to withstand an external load, the rubber molecule chains are damaged. In contrast, in the vulcanized rubber obtained from the rubber composition of the present invention, the damage to the rubber molecules can be prevented even under a large load.

Since a thiol group (—SH) of the compound (1) has excellent reactivity with the diene-based polymer, it is considered that when the rubber composition of the present invention is heat-kneaded, the compound (1) is likely to be bonded to the diene-based polymer by covalent bonds. A structure derived from the compound (1) is provided in a part of the diene-based polymer, whereby the diene-based polymer contains a primary amino group or a secondary amino group represented by —NHR¹ or —NHR². Accordingly, it is considered that molecular chains of the diene-based polymer form a hydrogen bond via the amino group.

When the rubber molecular chains of the vulcanized rubber are connected to each other by the hydrogen bond, it is considered that in a case where the vulcanized rubber receives a low strain load, the movement of the polymer is prevented by the presence of the hydrogen bond, whereby an energy loss is low and tan 6 of the vulcanized rubber is low. Therefore, the vulcanized rubber has an excellent low heat generation property, and for example, when vulcanized rubber made of the rubber composition of the present invention is used for a tire, the tire has an excellent fuel efficiency. On the other hand, it is considered that in a case where the vulcanized rubber receives a high strain load, the hydrogen bond, which is a bond weaker than the covalent bond, is broken first, and the energy is dispersed (that is, a sacrificial breakdown occurs). As a result, it is considered that the damage to the rubber molecular chains can be avoided.

Accordingly, it can be said that the vulcanized rubber obtained from the rubber composition of the present invention has an excellent balance between a low strain hysteresis loss and a high strain hysteresis loss, has an excellent low heat generation property, and excellent durability against a large external load.

Hereinafter, each component contained in the rubber composition will be described in detail.

[Rubber Component]

The rubber composition of the present invention contains the rubber component containing at least one selected from the group consisting of an isoprene rubber (IR), a butadiene rubber (BR), and a styrene-butadiene copolymer rubber (SBR).

The isoprene rubber (IR) may be a synthetic isoprene rubber or a natural rubber (NR). As the rubber component, one type of the diene-based polymer may be used alone, or two or more types thereof may be used in combination.

Among these, from the viewpoint of improving mechanical strength of the rubber product, the rubber component is preferably a butadiene rubber or a styrene-butadiene copolymer rubber, and more preferably a styrene-butadiene copolymer rubber.

When the styrene-butadiene copolymer rubber is used, a styrene content in the copolymer is not particularly limited, and is preferably larger than 0%, more preferably 1% or more, still more preferably 3% or more, and particularly preferably 5% or more. The upper limit is also not particularly limited, and is preferably 50% or less, more preferably 40% or less, still more preferably 30% or less, and particularly preferably 20% or less.

When the styrene-butadiene copolymer rubber is used, a vinyl content of a butadiene portion in the copolymer is not particularly limited, and is preferably 1% or more, more preferably 5% or more, still more preferably 10% or more, and particularly preferably 15% or more. The upper limit is also not particularly limited, and is preferably 70% or less, more preferably 60% or less, still more preferably 50% or less, and particularly preferably 45% or less.

A weight average molecular weight of the rubber component (measured by gel permeation chromatography in terms of monodisperse polystyrene) is not particularly limited, and is preferably 10,000 to 10,000,000, more preferably 50,000 to 5,000,000, still more preferably 100,000 to 3,000,000, and particularly preferably 150,000 to 2,000,000.

[Compound (1)]

The rubber composition of the present invention contains the compound (1) represented by the following general formula (1).

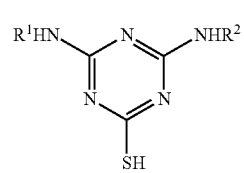

(1)

$R^1$ and $R^2$ in the general formula (1) each independently represent a hydrogen atom, an alkyl group having 1 to 20 carbon atoms, or an aryl group having 5 to 20 carbon atoms.

The compound (1) having an amino group in the diene-based polymer has one thiol group (—SH), and has two amino groups represented by —NHR¹ or —NHR².

When the compound (1) has two or more thiol groups, since there is a risk that the rubber molecular chains are bonded by covalent bonds, it is not possible to realize sacrificial breakdown that the hydrogen bond is broken first and the energy is dispersed when a high strain load is applied to the vulcanized rubber. PTL 1 discloses a rubber composition using a triazine compound having two thiol groups, but the balance between hysteresis losses of the vulcanized rubber has not been studied.

When the compound (1) does not have at least two amino groups, the number of hydrogen bonds is insufficient, the loss cannot be reduced at a low strain, and the loss cannot be increased at a high strain.

The alkyl group represented by $R^1$ and $R^2$ may be linear, branched or cyclic. Examples thereof include a methyl group, an ethyl group, an n-propyl group, an isopropyl group, an n-butyl group, a tert-butyl group, an n-hexyl group, a cyclohexyl group, an n-octyl group, an n-dodecyl group, and an n-octadecanyl group.

The alkyl group may further have a substituent such as a halogen atom, an amino group, or a hydroxy group.

The aryl group represented by $R^1$ and $R^2$ may be a monocyclic ring or a condensed ring. Examples thereof include a phenyl group and a naphthyl group.

The aryl group may further have a substituent such as a halogen atom, an amino group, a hydroxy group, or an alkyl group.

The number of carbon atoms in the alkyl group and the aryl group represented by $R^1$ and $R^2$ can be selected according to a purpose. For example, when the number of carbon atoms is small, steric repulsion can be prevented, and when the number of carbon atoms is large, compatibility with the rubber component of the compound (1) can be enhanced.

The content of the compound (1) in the rubber composition is preferably more than 0.5 parts by mass and 3 parts by mass or less with respect to 100 parts by mass of the rubber component.

When the content of the compound (1) in the rubber composition is more than 0.5 parts by mass with respect to 100 parts by mass of the rubber component, sufficient hydrogen bonds can be formed in the vulcanized rubber, and when the content is 3 parts by mass or less, excessive formation of the hydrogen bonds can be prevented.

From the viewpoint of the balance between a low strain hysteresis loss and a high strain hysteresis loss, the content of the compound (1) in the rubber composition is more preferably 0.6 to 2.8 parts by mass, and still more preferably 0.7 to 2.4 parts by mass with respect to 100 parts by mass of the rubber component.

[Filler]

The rubber composition of the present invention preferably contains a filler. When the rubber composition contains a filler, an elastic modulus of the rubber product can be improved, and a rubber product having excellent abrasion resistance can be obtained.

The filler is not particularly limited, and for example, a reinforcing filler that reinforces the rubber composition is used. Examples of the reinforcing filler include silica and carbon black, and either silica or carbon black may be used alone, or both silica and carbon black may be used.

(Carbon Black)

The carbon black is not particularly limited and may be appropriately selected depending on the purpose. Examples of the carbon black include FEF, SRF, HAF, ISAF, and SAF grades, and carbon black having a nitrogen adsorption specific surface area ($N_2SA$, measured in accordance with JIS K 6217-2:2001) of 20 $m^2/g$ to 250 $m^2/g$ can be used. Among these, HAF, ISAF, and SAF grades are preferable, and ISAF grade is more preferable.

(Silica)

The silica is not particularly limited, and silica of general grade, or special silica subjected to a surface treatment with a silane coupling agent, or the like, can be used depending on an intended use. Examples of the silica include wet method silica (hydrous silicic acid), dry method silica (silicic anhydride), calcium silicate, and aluminum silicate. Among these, wet method silica is preferable. These silica may be used alone or in combination of two or more.

As the wet method silica, precipitated silica can be used. The term "precipitated silica" refers to silica obtained as a result of aggregating primary particles by, at an initial stage of production, reacting a reaction solution in a relatively high temperature, advancing the reaction and growing silica primary particles in a neutral to alkaline pH region, and then controlling the reaction solution to an acidic side.

The silica is not particularly limited, and, for example, a cetyltrimethylammonium bromide adsorption specific surface area (CTAB specific surface area) can be 70 $m^2/g$ or more and 250 $m^2/g$ or less. The CTAB specific surface area means a value measured in accordance with ASTM D3765-92. An adsorption cross-sectional area per molecule of cetyltrimethylammonium bromide with respect to a silica surface is set to 0.35 $nm^2$, and a specific surface area ($m^2/g$) calculated based on a CTAB adsorption amount is set to the CTAB specific surface area.

A BET specific surface area of the silica can be 100 $m^2/g$ or more and 250 $m^2/g$ or less. The BET specific surface area is a specific surface area obtained by a BET method, and in the present invention, the BET specific surface area can be measured in accordance with ASTM D4820-93.

A content of the filler in the rubber composition is preferably 5 to 100 parts by mass, more preferably 30 to 100 parts by mass, still more preferably 35 to 100 parts by mass, and even more preferably 40 to 70 parts by mass, with respect to 100 parts by mass of the rubber component.

When the content of the filler in the rubber composition is 5 parts by mass or more with respect to 100 parts by mass of the rubber component, the elastic modulus of the vulcanized rubber is improved, and when the content is 100 parts by mass or less, flexibility of the vulcanized rubber is not easily impaired and breakdown elongation is not easily reduced. Generally, within the above range, the balance between a low strain hysteresis loss and a high strain hysteresis loss of the vulcanized rubber can be further improved.

In particular, when silica is contained as the filler, the rubber composition preferably contains 5 parts by mass or more of the silica with respect to 100 parts by mass of the rubber component. When carbon black is contained as the filler, the rubber composition preferably contains 30 parts by mass or more of the carbon black with respect to 100 parts by mass of the rubber component.

[Vulcanizing Agent]

The rubber composition of the present invention preferably contains a vulcanizing agent.

The vulcanizing agent is not particularly limited, and sulfur is usually used, and examples thereof include powdered sulfur, precipitated sulfur, colloidal sulfur, surface-treated sulfur, and insoluble sulfur.

A content of the vulcanizing agent in the rubber composition is preferably 0.1 to 10 parts by mass with respect to 100 parts by mass of the rubber component. When the content is 0.1 parts by mass or more, the vulcanization can be sufficiently advanced, and when the content is 10 parts by mass or less, aging of the vulcanized rubber can be prevented.

The content of the vulcanizing agent in the rubber composition is more preferably 0.3 to 7 parts by mass, and still more preferably 0.5 to 5 parts by mass with respect to 100 parts by mass of the rubber component.

[Other Components]

The rubber composition of the present invention may contain other components in addition to the above-described rubber component, compound (1), the filler, and vulcanizing agent.

The other components are not particularly limited, and a mixing agent commonly used in rubber industry, for example, a softener, stearic acid, an antioxidant, zinc oxide, a foaming auxiliary agent, or a vulcanization accelerator may be appropriately selected and contained within a range that does not impair the object of the present invention.

<Preparation of Rubber Composition>

The rubber composition of the present invention can be produced by mixing the above-described components and kneading the components using a kneading machine such as a Banbury mixer, a roll, or an internal mixer.

Here, a mixing amount of the rubber component, the compound (1), the filler, and the like is the same as the amount described above as the content in the rubber component.

The kneading of the components may be performed in one stage or may be performed in two or more stages. Examples of a method of kneading the components in two stages include a method of kneading the components such as the rubber component, the compound (1), and the filler in the first stage, and kneading a vulcanization package containing the vulcanizing agent, a vulcanization accelerator, and zinc oxide in the second stage.

A maximum temperature in the first stage of kneading is preferably 130° C. to 170° C., and the maximum temperature in the second stage is preferably 90° C. to 120° C.

<Rubber Product>

A rubber product of the present invention contains the rubber composition of the present invention.

More specifically, the rubber product of the present invention is a product obtained by processing the vulcanized rubber obtained by vulcanizing the rubber composition of the present invention in accordance with various applications.

The rubber product of the present invention can be applied to various products since the rubber product has an excellent balance between a low strain hysteresis loss and a high strain hysteresis loss and high mechanical strength. For example, the rubber product is suitable for a tire and an automobile part (an automobile seat, an automobile battery (a lithium ion battery or the like), a weather strip, a hose tube, an anti-vibration rubber, a cable, a sealing material, and the like), a ship component, a building material, and the like.

In addition, the rubber product of the present invention is suitable for a conveyor belt, a crawler, an anti-vibration rubber, a hose, a resin piping, a sound absorbing material, a bedding, a precision component for office equipment (OA roller), a bicycle frame, a golf ball, a tennis racket, a golf shaft, a resin additive, a filter, a medical instrument (a medical tube, a back, a microneedle, a rubber sleeve, an artificial organ, a cap, a packing, a syringe gasket, a drug plug, a prosthetic leg, and a prosthetic limb), a cosmetic container, a building material (a floor material, a vibration damping rubber, a seismic isolation rubber, a building film, a sound absorbing material, a waterproof sheet, a heat insulating material, a joint material, and a sealing material), a packaging material, a liquid crystal material, an organic EL material, an organic semiconductor material, an electronic material, an electronic device, a communication device, an aircraft component, a machine component, an electronic component, an agricultural material, an electric wire, a cable, a fiber (a wearable base), a daily necessity (a toothbrush, a shoe sole, glasses, artificial food, binoculars, a toy, a dust-proof mask, and a garbage hose), a robot component, an optical component, a road material (asphalt, a guardrail, a pole, and a sign), a protector (a shoe, a stepping prevention safety shoe, and a bulletproof vest), an electrical device exterior component, an OA exterior component, a sole, a seal material, and the like.

In the above description, OA means office automation, UV means ultraviolet, and EL means electro-luminescence.

For example, when the rubber product is used as a tire, the tire can be produced as follows.

The rubber composition of the present invention is processed into, for example, a tire tread shape to form a tread layer, the tread layer is sequentially laminated together with members normally used for tire production such as a carcass layer and a belt layer, and a drum is removed to obtain a green tire. Next, the green tire is heated and vulcanized in accordance with a method in the related art, whereby a desired tire (for example, a pneumatic tire) can be produced.

The obtained tire has an excellent balance between a low strain hysteresis loss and a high strain hysteresis loss, in other words, the tire has excellent fuel efficiency and excellent durability even under a large load.

EXAMPLES

Hereinafter, the present invention will be described in more detail with reference to Examples. The present invention is not limited to the following Examples. First, a method of evaluating a tire according to Examples will be described.

<Preparation of Rubber Composition>

Component were kneaded in a mixing composition shown in Table 1 or 2 to prepare a rubber composition.

Details of the components shown in Tables 1 and 2 are as follows.

SBR: styrene-butadiene copolymer rubber produced by the following production method Carbon black: ISAF, trade name "N234", manufactured by Tokai Carbon Co., Ltd.

Silica: trade name "Nipsil AQ" manufactured by Tosoh Silica Corporation

Stearic acid: "Stearic acid 50S" manufactured by New Japan Chemical Co., Ltd.

Wax: microcrystalline wax, "SUNTIGHT" manufactured by Seiko Chemical Co., Ltd.

Antioxidant: trade name "NOCRAC 6C" manufactured by Ouchi Shinko Chemical Industrial Co., Ltd.

Compound (1): compound in which $R^1$ and $R^2$ in the general formula (1) are hydrogen atoms, 2,4-diamino-6-mercapto-1,3,5-triazine Sulfur: "powdered sulfur" manufactured by Tsurumi Chemical Industry Co., Ltd.

Vulcanization accelerator A: di-2-benzothiazyl disulfide

Vulcanization accelerator B: N-t-butyl-2-benzothiazolyl sulfenamide

Zinc oxide: "zinc oxide #3" manufactured by Hakusui Tech.

(Production of Styrene-Butadiene Copolymer Rubber)

Cyclohexane (240 g), a butadiene/cyclohexane solution (25% by mass, 204 g), and a styrene/cyclohexane solution (29% by mass, 19.5 g) were added and mixed in a glass bottle in an inert atmosphere, and then a 2,2-di-(2-tetrahydrofuryl)propane/cyclohexane solution (0.1 M, 0.75 mL) and n-butyllithium (1.6 M, 0.37 mL) were added. The mixture was gently shaken at 50° C. for 3 hours, and then degassed isopropyl alcohol was added in an appropriate amount to terminate polymerization. The obtained polymer cement was reprecipitated with isopropyl alcohol, and 0.5 mL of an isopropyl alcohol solution of 2,6-di-t-butyl-p-cresol (5% by mass) was added, followed by drying under a reduced pressure to obtain a styrene-butadiene copolymer rubber (SBR).

When molecular properties of the polymer were examined based on an integral ratio in $^1$H-NMR, a styrene content of the polymer was 9% and a vinyl content of the butadiene portion was 36%. When the weight average molecular weight of the polymer was measured by gel permeation chromatography, the weight average molecular weight was 170,000 in terms of monodisperse polystyrene.

<Physical Properties of Vulcanized Rubber>

Each of rubber compositions in Examples and Comparative Examples was vulcanized to obtain a vulcanized rubber.

The vulcanized rubber was subjected to a loading-unloading test at a temperature of 25° C., a strain of 10% or a strain of 250%, and a speed of 200 mm/sec using a universal material testing machine (manufactured by Instron Co., Ltd.), and a proportion of the energy loss was measured.

An energy loss ratio in Comparative Example 1 was set as 100 and expressed exponentially by the following equation.

Low strain energy loss index=(energy loss ratio at 10% strain in vulcanized rubber/energy loss ratio at 10% strain of vulcanized rubber in Comparative Example 1)×100

High strain energy loss index=(energy loss ratio at 250% strain in vulcanized rubber/energy loss ratio at 250% strain of vulcanized rubber in Comparative Example 1)×100

As the low strain energy loss index is smaller, the vulcanized rubber has an excellent low heat generation property, and as the high strain energy loss index is larger, the vulcanized rubber has excellent durability. An allowable range of the low strain energy loss index is 95 or less, and an allowable range of the high strain energy loss index is 100 or more.

TABLE 1

|  |  |  | Comparative Example 1 | Example 1 | Example 2 |
|---|---|---|---|---|---|
| Kneading First stage | SBR | Part | 100 | 100 | 100 |
|  | Carbon black | Part | 50 | 50 | 50 |
|  | Stearic acid | Part | 2 | 2 | 2 |
|  | Wax | Part | 2 | 2 | 2 |
|  | Antioxidant | Part | 1 | 1 | 1 |
|  | Compound (1) | Part | 0 | 0.7 | 1.4 |
| Kneading Second stage | Sulfur | Part | 1 | 1.1 | 1.1 |
|  | Vulcanization accelerator A | Part | 1 | 1.4 | 1.4 |
|  | Vulcanization accelerator B | Part | 1 | 0.5 | 0.5 |
|  | Zinc oxide | Part | 3 | 2.5 | 2.5 |
| Physical properties | Low strain energy loss index (10%) |  | 100 | 85 | 90 |
|  | High strain energy loss index (250%) |  | 100 | 103 | 104 |

TABLE 2

|  |  |  | Comparative Example 2 | Example 3 |
|---|---|---|---|---|
| Kneading First stage | SBR | Part | 100 | 100 |
|  | Silica | Part | 50 | 50 |
|  | Stearic acid | Part | 2 | 2 |
|  | Wax | Part | 2 | 2 |
|  | Antioxidant | Part | 1 | 1 |
|  | Compound (1) | Part | 0 | 0.7 |
| Kneading Second stage | Sulfur | Part | 1.1 | 1.1 |
|  | Vulcanization accelerator A | Part | 1.4 | 1.4 |
|  | Vulcanization accelerator B | Part | 0.5 | 0.5 |
|  | Zinc oxide | Part | 2.5 | 2.5 |
| Physical properties | Low strain energy loss index (10%) |  | 100 | 88 |
|  | High strain energy loss index (250%) |  | 100 | 100 |

From a comparison between Examples and Comparative Examples in Tables 1 and 2, the vulcanized rubbers obtained from the rubber compositions of Examples 1 to 3 each have a low strain energy loss index of 95 or less and a high strain energy loss index of 100 or more. That is, the vulcanized rubbers in Examples have an excellent balance between a low strain hysteresis loss and a high strain hysteresis loss.

The invention claimed is:

1. A rubber composition comprising:
   a rubber component containing at least one selected from the group consisting of an isoprene rubber, a butadiene rubber, and a styrene-butadiene copolymer rubber; and
   a compound (1) represented by the following general formula (1):

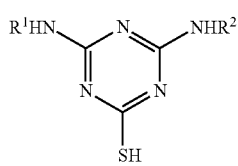

[R1 and R2 in the general formula (1) each independently represent a hydrogen atom, an alkyl group having 1 to 20 carbon atoms, or an aryl group having 5 to 20 carbon atoms].

2. The rubber composition according to claim 1, further comprising:
   5 parts by mass or more of silica with respect to 100 parts by mass of the rubber component.

3. The rubber composition according to claim 1, further comprising:
   30 parts by mass or more of carbon black with respect to 100 parts by mass of the rubber component.

4. The rubber composition claim 1, wherein
   a content of the compound (1) is more than 0.5 parts by mass and 3 parts by mass or less with respect to 100 parts by mass of the rubber component.

5. A rubber product using the rubber composition according to claim 1.

6. The rubber composition according to claim 2, further comprising:
   30 parts by mass or more of carbon black with respect to 100 parts by mass of the rubber component.

7. The rubber composition according to claim 2, wherein
   a content of the compound (1) is more than 0.5 parts by mass and 3 parts by mass or less with respect to 100 parts by mass of the rubber component.

8. A rubber product using the rubber composition claim 2.

9. The rubber composition according to claim 3, wherein
   a content of the compound (1) is more than 0.5 parts by mass and 3 parts by mass or less with respect to 100 parts by mass of the rubber component.

10. A rubber product using the rubber composition claim 3.

11. A rubber product using the rubber composition claim 4.

12. The rubber composition according to claim 6, wherein
    a content of the compound (1) is more than 0.5 parts by mass and 3 parts by mass or less with respect to 100 parts by mass of the rubber component.

13. A rubber product using the rubber composition claim 6.

14. A rubber product using the rubber composition claim 9.

15. A rubber product using the rubber composition claim 12.

* * * * *